(12) United States Patent
El-Barbari et al.

(10) Patent No.: US 12,143,040 B2
(45) Date of Patent: Nov. 12, 2024

(54) DRIVE SYSTEM HAVING HARMONICS INFEED

(71) Applicant: Bayerische Motoren Werke Aktiengesellschaft, Munich (DE)

(72) Inventors: Said El-Barbari, Freising (DE); Daniel Glose, Munich (DE); Jovan Knezevic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 18/003,762

(22) PCT Filed: May 27, 2021

(86) PCT No.: PCT/EP2021/064160
§ 371 (c)(1),
(2) Date: Dec. 29, 2022

(87) PCT Pub. No.: WO2022/002491
PCT Pub. Date: Jan. 6, 2022

(65) Prior Publication Data
US 2023/0261599 A1    Aug. 17, 2023

(30) Foreign Application Priority Data

Jun. 30, 2020    (DE) .................... 10 2020 117 149.8

(51) Int. Cl.
*H02K 3/28*    (2006.01)
*H02P 21/00*    (2016.01)
(Continued)

(52) U.S. Cl.
CPC ............ *H02P 25/022* (2013.01); *H02P 21/50* (2016.02); *H02P 25/22* (2013.01); *H02P 27/06* (2013.01)

(58) Field of Classification Search
CPC ........ H02P 25/022; H02P 21/50; H02P 25/22; H02P 27/06; H02P 21/05
See application file for complete search history.

(56) References Cited

U.S. PATENT DOCUMENTS

| | | | |
|---|---|---|---|
| 2006/0091845 A1* | 5/2006 | Consoli | H02P 21/05 318/712 |
| 2008/0103632 A1* | 5/2008 | Saban | H02P 29/50 310/156.01 |
| 2010/0244599 A1* | 9/2010 | Saban | H02K 11/33 310/71 |

FOREIGN PATENT DOCUMENTS

| | | |
|---|---|---|
| DE | 10 2016 219 147 A1 | 4/2018 |
| DE | 10 2016 224 374 A1 | 6/2018 |

(Continued)

OTHER PUBLICATIONS

PCT/EP2021/064160, International Search Report dated Aug. 9, 2021 (Two (2) pages).

(Continued)

*Primary Examiner* — Muhammad S Islam
(74) *Attorney, Agent, or Firm* — Crowell & Moring LLP

(57) ABSTRACT

A drive system includes an electric machine with a rotor having an externally excited rotor winding, and a stator having stator winding sets, each with at least three stator windings; a control unit controlling the electric machine supply the rotor winding with a first current signal, and the stator windings with different current phases of a multi-phase second current signal, thus producing a rotary magnetic field generating a torque on the rotor; at least one inverter, the multi-phase current signal being provided based on the at least one inverter; and at least one rectifier providing a DC signal, the first current signal being based at least on the DC signal and on an AC harmonics component. Harmonics of a current phase of the multi-phase current (Continued)

signal are reduced based on the supply of the AC harmonics component.

9 Claims, 3 Drawing Sheets

(51) Int. Cl.
  *H02P 25/022* (2016.01)
  *H02P 25/22* (2006.01)
  *H02P 27/06* (2006.01)

(56) References Cited

FOREIGN PATENT DOCUMENTS

| DE | 10 2018 202 005 A1 | 8/2019 |
| DE | 10 2018 202 967 A1 | 8/2019 |
| EP | 1 906 523 A1 | 4/2008 |
| EP | 3 026 810 B1 | 6/2016 |

OTHER PUBLICATIONS

German Search Report issued in German application No. 10 2020 117 149.8 dated Mar. 26, 2021, with Statement of Relevancy (Eight (8) pages).

\* cited by examiner

DRIVE SYSTEM HAVING HARMONICS INFEED

CROSS REFERENCE TO RELATED APPLICATION

This application is a 371 of International Application No. PCT/EP2021/064160, filed May 27, 2021 which claims priority under 35 U.S.C. § 119 from German Patent Application No. 10 2020 117 149.8, filed Jun. 30, 2020, the entire disclosure of which is herein expressly incorporated by reference.

BACKGROUND AND SUMMARY OF THE INVENTION

Field of Invention

The invention relates to a drive system and an electrically drivable vehicle.

Technical Background

Drive systems comprising electric machines, in particular electric motors, are nowadays used in various applications. Electric machines are also used in electrically driven vehicles as electric prime movers. In the present context, the term "electric prime mover" refers in particular to electric machines that generate propulsion in the form of torque for a motor vehicle. The electrical energy from a battery or accumulator is to be used as efficiently as possible. Ideally, the efficiency and torque of an electric machine are optimized for this purpose. Synchronous machines are often used for this.

Synchronous machines comprise at least one rotor and one stator, between which there is formed an air gap. Rotors of synchronous machines have either permanent magnets or separately excited rotor windings. The stator comprises stator windings. If an electric current is supplied to these stator windings, a rotary magnetic field can be generated in the air gap, which can produce a torque that drives the rotor.

A synchronous machine that has an increased number of stator windings enables a higher maximum achievable machine output. However, magnetic coupling occurs between the stator windings and the rotor winding during operation. This can lead to harmonics being induced in the phase currents of the stator windings by rotor harmonics. These harmonics cause losses, such that the achievable maximum machine output is adversely affected. In addition, the components involved are subjected to higher stresses, which can have a detrimental effect on service life.

The harmonics can generally be attenuated or avoided by additional filters. However, such filters increase the complexity, weight, and cost of the drive system. Another approach involves providing wide-bandwidth current control. However, this requires an increased switching frequency of the inverters involved, which in turn leads to increased losses.

BRIEF SUMMARY OF THE INVENTION

The underlying technical problem can be seen as that of providing a drive system and an electrically drivable vehicle by means of which, on the one hand, an increased power output is provided, but at the same time the losses are reduced.

The problem is solved by the embodiments, developments and variants described herein.

Among other things, a drive system is provided. The drive system comprises an electric machine. The electric machine is set up in the manner of a synchronous machine.

The electric machine comprises a rotor which is rotatable about an axis of rotation and has at least one externally excited rotor winding.

The electric machine also comprises at least one stator having at least two stator winding sets. Each stator winding set has at least three stator windings.

The drive system additionally comprises a control unit. The control unit is set up and formed in such a way that the at least one rotor winding is supplied with a first current signal during operation and the stator windings are supplied at least partly with different current phases of a multi-phase second current signal during operation and, as a result, a rotary magnetic field for generating a torque acting on the rotor is produced.

The drive system also comprises at least one inverter. The multi-phase current signal for supplying to the stator windings is provided based on the at least one inverter.

Furthermore, the drive system comprises at least one rectifier. A DC signal is provided by the rectifier.

The first current signal used for supplying to the at least one rotor winding is based at least on the DC signal provided by the rectifier and on an AC harmonics component. Based on the supply of the at least one AC harmonics component to the at least one rotor winding, harmonics of at least one current phase of the multi-phase current signal, which are caused by a magnetic coupling occurring between the at least one rotor winding and the stator windings during operation, are reduced.

The drive system can also comprise an additional inverter, based on which the AC harmonics component for supplying the at least one rotor winding is provided. Alternatively, the at least one AC harmonics component can also be provided by the inverter, which also provides the multi-phase current signal for supplying the stator windings.

In operation, the rotor rotates about the axis of rotation relative to the stator at a certain rotational frequency. Harmonics of the rotor that have frequencies that are an integer multiple of the rotation frequency and/or the rotary field can cause harmonics (harmonics currents) in the supply lines (current phases) of the stator windings due to the magnetic coupling and the resulting low impedance. These harmonics (harmonics currents) can cause load peaks. On the one hand, this results in the components involved (for example inverter, stator windings, supply lines) having to withstand additional stresses (for example increased maximum current amplitudes) and, on the other hand, in the maximum torque provided by the electric machine being reduced. This is because, in order to avoid damage and/or premature wear on the relevant components, the machine cannot then be operated permanently at the actual maximum setpoint power.

In the present case, the external excitation of the rotor winding by means of the rectifier provides an additional degree of freedom to compensate for the harmonics caused by the magnetic coupling in the current phases of the stator windings. Permanent magnet synchronous machines lack this degree of freedom. The current signal provided for the rotor winding can therefore be adapted in such a way that the harmonics in the current phases of the stator windings are compensated and/or reduced. The drive system formed as described above makes it possible, in case of the current signal provided for the rotor winding, to provide at least one additional AC harmonics component (in addition to the DC component) which is superimposed and/or balanced in a "destructive" manner by the harmonics of the current phases of the stator windings caused by the magnetic coupling, so that their adverse effects are at least reduced.

The at least one inverter and the at least one rectifier as well as also the optional additional inverter (provision of the at least one AC harmonics component) can be coupled to at least one control loop by means of real-time communication means. The at least one control loop can be set up to determine a phase and/or an amplitude of the at least one AC harmonics component, taking into account the operating states of the rectifier and/or the inverter and/or the control by the control unit, in such a way that the harmonics of at least one current phase of the multi-phase current signal caused by the magnetic coupling are reduced according to an amplitude. The at least one AC harmonics component can also be determined in such a way that the harmonics caused by the magnetic coupling can be substantially compensated.

In other words, the control loop can be coupled to suitable sensors that provide information about currently prevailing harmonics caused by the magnetic coupling of at least one current phase of the multi-phase current signal. Further, the control loop can be coupled to the inverter and the rectifier to additionally couple, in real time, at least one AC harmonics component into the direct current provided by the rectifier to the at least one rotor winding. The at least one coupled AC harmonics component can be formed here according to phase and/or amplitude with respect to the harmonics of the at least one current phase caused by the magnetic coupling in such a way that, after interaction based on the magnetic coupling within the synchronous machine, the harmonics of the at least one current phase is reduced in amplitude in a "destructive" manner and/or is substantially compensated. In this context, the control loop can also take into account the functionality of further controls or control loops, in particular the control by the control unit, which can serve to determine the current phases as a function of the actual currents prevailing in the electric machine in comparison with setpoint currents determined by the desired torque and/or as a function of an angular position of the rotor with respect to the stator and/or a rotational speed of the rotor. The control loop determining the amplitude and/or phase of the AC harmonics component can thus be coupled in particular with the usual exciter control loop and/or inverter current controller and can take into account their respective controls.

The term "real-time communication means" can be understood in the present context as a communication structure, a bus system or similar, which enables a control in such a way that a sampling rate of the control is shorter than the period of the rotor determined by the rotation frequency. In particular, the sampling rate can be smaller than the period duration of the rotor by at least a factor of 10, further in particular a factor of 100, further in particular a factor of 1000. The real-time communication can also enable such a fast control that the remaining generally variable quantities of the synchronous machine can be assumed to be constant for a time interval determined by the sampling rate of the real-time communication. Advantageously, this allows the coupling of the AC harmonics components in such a way that they can reduce or compensate the harmonics caused by the magnetic coupling without the latter having changed significantly in the meantime.

The inverter, rectifier, and control loop can also be arranged to provide a plurality of AC harmonics components. The at least one rotor winding can be supplied with the plurality of AC harmonics components with respective amplitudes and/or phases in such a way that the harmonics caused by the magnetic coupling for each current phase of the multi-phase current signal (i.e., for each stator winding) are reduced in amplitude and/or substantially compensated. Thus, as the different current phases are supplied to the individual stator windings, the adverse effects resulting from the magnetic coupling can be reduced and/or compensated for each of the stator windings. For this purpose, in particular, a plurality of inverters and/or control circuits of a corresponding type can be provided. Alternatively, the inverter and/or the control circuit can also be of a multi-phase design, i.e., in such a way that the advantages described can be provided by individual components for all current phases in a corresponding manner. Thus, despite an increased number of windings, which generally enables an increased power output of the electric machine, the power loss can be reduced. In addition, this also reduces the stress on the components involved.

The at least one AC harmonics component can have a first frequency. A second frequency of a fundamental wave can be based on a rotational frequency of the rotor and/or the rotary field. The first frequency can be an integer multiple of the second frequency. Since the synchronous machine in the present case comprises a stator with at least 2 three-phase stator winding sets, the parasitic harmonics in the current phases of the stator windings caused by the magnetic coupling can, in particular, be harmonics of the fundamental frequency. In order to compensate for these, the AC harmonics components provided for compensation must likewise have frequencies corresponding to a multiple of the fundamental frequency.

In particular, the frequency of the at least one AC harmonics component can correspond to a frequency of the $4^{th}$ or $6^{th}$ harmonic. As a result, harmonics on the stator side of the $5^{th}$ or $7^{th}$ order can be compensated. Thus, the modulation index that can be achieved can be advantageously increased, so that the machine output power (maximum torque that can be provided) can also be increased.

Based on the control unit, the stator winding sets can be supplied with a three-phase current during operation, i.e., in each case with individual current phases of a three-phase current. Different current phases of the three-phase current can be supplied to the stator windings of a particular stator winding set. The number of current phases can be at least six.

The three-phase current must be understood here as a vector quantity with a plurality of components. The three-phase current can be provided by a corresponding power supply with three phase components (Iu, Iv, Iw). These can then be transformed into a stator-proof and decoupled current with corresponding components by means of a Clarke transformation. Subsequently, a Park transformation can then be used to determine the components Id (torque-forming component) and Iq (flux-forming component). According to the d/q transformation, Id and Iq then generally form orthogonally opposed components to describe the three-phase current, wherein the d/q coordinate system rotates along with the rotor according to its rotational frequency. For a temporally constant rotational speed, the rotary field can then be described in terms of two temporally constant quantities d and q.

The rotor can be circular. The stator can be circular. The stator can be arranged about the axis of rotation. The stator can be arranged such that an air gap is formed between the rotor and the stator.

The stator can have stator teeth. The stator teeth can be generally aligned with the rotor. The stator windings of the stator winding sets can be disposed on the stator teeth. The stator windings can have a corresponding number of windings to be able to achieve a certain torque. The stator windings of a stator winding set can have an angular offset of 120° with respect to each other with respect to the circumference of the stator. The first stator winding set can have a predetermined angular offset with respect to the circumference of the stator relative to the second stator winding set, in particular of 30°. This allows the individual stator winding sets to each form a discrete, symmetrical winding distribution. By contrast, the stator windings as a whole can be unevenly distributed with respect to the circumference of the stator. The phase shift described in this way can make it possible to avoid odd harmonics ($5^{th}$ or $7^{th}$ order) within the stator. However, these can still be induced in the stator due to the magnetic coupling with the separately excited rotor winding in general.

The angular offset of 30° can result in a pairing of stator windings with respect to the circumference, wherein each pair comprises one stator winding of a stator winding set. Magnetic coupling can occur between all stator windings of the electric machine and the rotor winding during operation, which influences the current phase of the respective stator windings so that harmonics can be generated. However, for correspondingly odd rotor harmonics ($5^{th}$ or $7^{th}$ order), the stator impedance (particularly large magnetic coupling, leakage inductance) can be very low, so that such harmonics can be induced by the externally excited rotor in the stator windings and their current phases. The harmonics induced nevertheless can then be reduced and/or compensated for in this way based on the at least one AC harmonics component supplied to the rotor winding.

Preferably, the rotor can be formed in the manner of a cage rotor. For this purpose, the rotor can have a plurality of rotor bars arranged evenly around the circumference and extending along the axis of rotation. The rotor bars can also be arranged spaced apart from one another in the circumferential direction.

The stator winding sets can each be connected in a star circuit with a potential-free star point. The star points of the different stator winding sets can be electrically isolated from each other. The star connection means that the three phases of a particular stator winding set can be electrically connected to each other at one end. With their respective other ends, the three phases of the stator winding sets can each be connected to a current phase of the control unit and/or the inverter(s). Thus, each phase of a stator winding set can be connected to a phase of the three-phase power system.

In particular, the star point cannot be connected to a ground potential. This embodiment is made possible by the mutually cancelling currents within the star point. This significantly reduces the manufacturing and interconnection costs of the electric machine. As a result, the sum of all currents occurring within the interconnected stator winding sets can add up to zero and no harmonics of which the order corresponds to a multiple of the number 3 can occur.

The control unit can be formed in conjunction with the at least one inverter and/or in conjunction with an inverter control circuit for an adjustment of the predetermined frequency and/or an amplitude of the impressed multi-phase current. For this purpose, the inverter can optionally have, in particular, corresponding current controllers for the individual current phases of the multi-phase current signal. In particular, a three-phase current can be impressed. In the present context, "impressed" is generally understood to mean the supply of a multi-phase current, in particular a three-phase current, to the stator windings. The control unit can comprise a data acquisition unit. The control unit and/or the inverter with the optional current controller(s) can also comprise switching elements by means of which the supply of the stator windings can be determined. The switching elements can be part of one or more inverters and/or the current controller(s), which can be considered as belonging to the control unit. In particular, the control unit can be arranged to determine switch-on and switch-off times of the supply of the current (three-phase current) to the stator windings. The control unit can be set up to perform the control of the supply of the current to the stator windings as a function of the angular position of the rotor relative to the stator. For this purpose, the electric machine can comprise a position sensor or similar sensor by means of which the angular position of the rotor relative to the stator can be determinable. The position sensor or similar sensor can be coupled to the control unit or can be a part thereof.

The control loop for determining the at least one AC harmonics component can then in particular also be set up in such a way that the rotor position is taken into account when determining the AC harmonics component. In other words, the AC harmonics component can be coupled into the current signal supplied to the at least one rotor winding in such a way that the desired compensation of the harmonics in the current phases is also achieved. Alternatively, the phase of the at least one AC harmonics component can be adapted accordingly.

The electric machine can in particular also comprise sensors by means of which the coupling occurring in the electric machine between a first and a second stator winding and/or the rotor winding can be determined. Alternatively or additionally, sensors can also be provided in such a way that the harmonics caused by the magnetic coupling are detectable. The control unit and in particular the control loop can then be set up to take the detected harmonics into account when determining the at least one corresponding AC harmonics component.

Since the electric machine can, in particular, have two stator winding sets, each with three stator windings, the inverter can preferably be two three-phase inverters which can be connected on the input side to a DC link within the motor vehicle and/or to a battery of the motor vehicle. The DC link and/or the battery can be used to provide energy for the electric machine. On the output side, the inverters can each be coupled to optional current controllers by means of which the amplitudes of the three-phase current can be adjustable. In this respect, the inverters can be set up to provide corresponding control voltages for the control of the amplitudes, which can be performed by the current controllers.

The rotary magnetic field can run radially in the air gap, i.e., in or against the radial direction. In the circumferential direction, i.e., in the direction of rotation of the rotor, the rotary magnetic field can have a rectangular staircase waveform, which can be approximated by superimposing a sinusoidal fundamental wave with sinusoidal harmonics. In this respect, the course of the rotary magnetic field can be approximated by means of Fourier series expansion into a sinusoidal fundamental wave and a number of sinusoidal harmonics of odd order.

Such a consideration of the rotary magnetic field as a superposition of a sinusoidal fundamental wave with sinusoidal harmonics can therefore be used here as a representative of the rotary magnetic field as a torque-generating factor within the electric machine. Thus, on the basis of an approximation of the rotary magnetic field, it can be possible to achieve optimized characteristics of the rotary magnetic field and thus an optimization of the generated torque with the aid of the control unit by advantageously supplying the stator winding sets. At the same time, the parasitic harmonics resulting from the magnetic coupling between the stator windings and the at least one rotor winding of the electric machine can be reduced and/or even substantially compensated for by the corresponding infeed of AC harmonics signal components, appropriately adapted in terms of phase and amplitude, into the current signal used for supplying the rotor winding.

However, the electric machine can also be operated in the manner of a synchronous machine. In this respect, the frequency of the rotor and the speed of the rotary magnetic field can be the same.

The inverter for providing the multi-phase current signal can be set up in the manner of a full-bridge DC-DC converter. The converter can then comprise diagonally active switching elements.

The inverter with the optional current controller(s) can furthermore be formed in such a way that a frequency and/or an amplitude of the individual currents of the stator winding sets can be adjustable during operation of the electric machine in such a way that the rotary field characteristics already described, approximated by the respective waves, can result. The adjustment of the amplitude and/or frequency can be effected for example by a control signal of semiconductor switching elements within the inverters. The control signal can be provided by the control unit, for example. For this purpose, for example, the respective different current values required for setting a specific operating mode can be stored in the control unit for each phase, in particular as a function of the momentary driving situation, such as the momentary load requirement. The determination of the phase current values required for a particular operating mode can, for example, be carried out on a simulation basis with the aid of commercially available programs, especially in the context of the development of such a machine type. The phase current values determined in this way can then be read into a memory of the control unit, for example for the particular motor vehicle.

During operation of the electric machine, the momentary actual phase currents can be detected. In order to set an operating mode, the phase current values stored for the relevant operating mode can preferably be set by the inverter with the optional current controllers, i.e., the individual phases can be supplied with the corresponding current values. An adjustment of the phase currents can, for example, be carried out in the manner of a setpoint/actual value comparison, in which a momentary phase current is detected and can be adjusted to the required value by the corresponding inverter. Thus, a control to the required value takes place. The adapted current of the stator winding sets can then produce the desired rotary field curve, wherein the parasitic harmonics resulting from the magnetic coupling are compensated or at least attenuated.

Alternatively or additionally, intermediate circuits of the inverter(s) can be interconnected to achieve a more accurate synchronization of the current flowing to the stator winding sets.

According to a further aspect, there is also provided an electrically drivable vehicle comprising a drive system as previously described. In the sense of the present invention, electrically drivable vehicles can in particular comprise land vehicles, namely, inter alia, electric scooters, e-scooters, two-wheelers, motorcycles, three-wheelers, trikes, quads, off-road and on-road vehicles such as passenger cars, buses, trucks and other commercial vehicles, rail vehicles (trains), but also watercraft (boats) and aircraft, such as helicopters, multicopters, propeller planes and jet planes, which comprise at least one electric motor serving to propel the vehicle. Vehicles can be manned or unmanned. In addition to pure electric vehicles (BEV), hybrid electric vehicles (HEV), plug-in hybrids (PHEV), and fuel cell vehicles (FCHV) can also be included.

DETAILED DESCRIPTION

Figure 1:
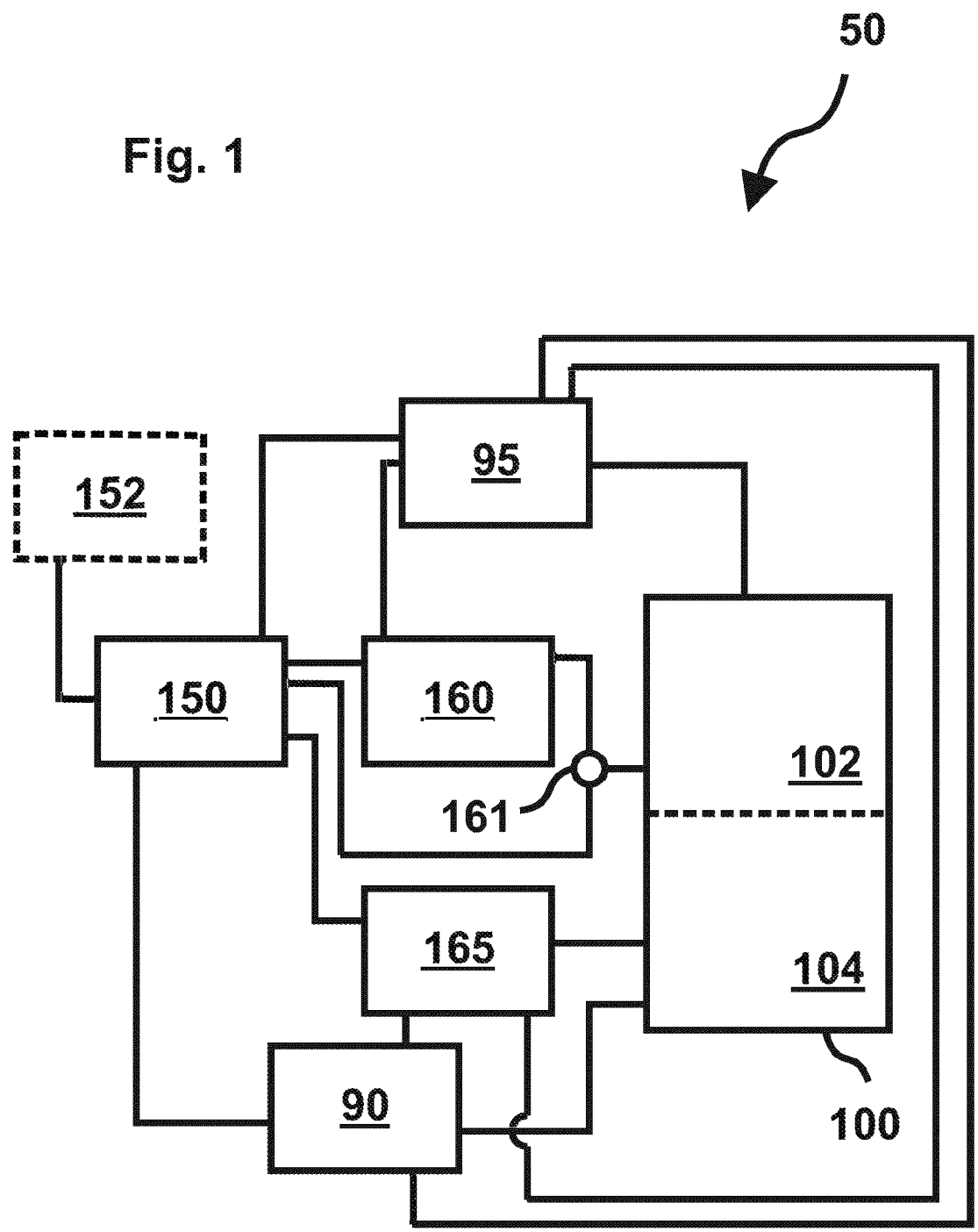
FIG. 1 shows a simplified schematic diagram of an equivalent circuit of the drive system.

FIG. 1 shows a simplified schematic diagram of an equivalent circuit of the drive system 50. Here, the general structure of the drive system 50 is first clarified. The drive system 50 comprises a voltage source 152, a control unit 90, a control loop 95, an electric machine 100 comprising a rotor 102 and a stator 104, a rectifier 150, a first inverter 160, and a second inverter 165. The first and second inverters 160, 165 can also be combined in a single inverter. The rotor 102 comprises an externally excited rotor winding. The stator 104 comprises two three-phase stator winding sets, each having three stator windings 110. At least the inverter 165 is multi-phase.

The voltage source 152 can be, for example, an accumulator of an electrically drivable vehicle, i.e., a DC voltage source. The voltage source 152 is to be considered as not belonging to the drive system 50 (optional) and is therefore shown with dashed lines.

The rectifier 150 is coupled to the voltage source 152, or at least a corresponding DC voltage is provided to the rectifier 150 on the input side. On the output side, the rectifier 150 is coupled to both the rotor 102 of the electric machine 100, the first inverter 160 and also the second inverter 165. The first inverter 160 is also coupled on the output side to the rotor 102 of the electric machine 100. The direct current output from the rectifier 150 for the rotor winding of the rotor 102 is combined with the AC harmonics component provided by the first inverter 160 by a coupling element 161 to form a total current provided for the rotor winding of the rotor 102. In this respect, the direct current provided by the rectifier 150 for the rotor winding is modified by a corresponding alternating current (AC harmonics component) provided by the first inverter 160.

The second inverter 165 provides the multi-phase current signal to the stator windings 110 of the stator 104.

The control unit 90 is coupled at least to the rectifier 150, the second inverter 165, and the electric machine 100. The control unit 90 is set up to configure the multi-phase current signal provided by the second inverter 165 to the stator windings 110 such that current phases of corresponding amplitudes and phases are supplied to the stator windings 110 such that a desired torque is achieved by the electric machine 100. This control of the control unit can be based on an actual current/setpoint current comparison. For this control, affecting only the stator windings 110, the control unit 90 can be set up to take into account the magnetic coupling between the stator windings 110. The target currents of the individual current phases can be stored here in a memory as a function of the desired output power. The second inverter 165 can optionally include corresponding current controllers, in particular to adjust the phases and/or amplitudes of the provided current phases.

The magnetic coupling between the rotor 102 and the stator 104 (more specifically, between their windings) of the electric machine can cause harmonics to be generated by the rotor 102 in the current phases of the stator windings 110.

The control loop 95 is therefore coupled to the control unit 90, the rectifier 150, the first inverter 160, the second inverter 165, and the electric machine 100 by real-time communication means. Based on appropriate sensors, the control circuit 95 can obtain information about the order, phase, and amplitude of harmonics induced in the current phases of the stator windings 110. The control circuit 95 then considers the time-dependent control states of the rectifier 150, the first inverter 160, the second inverter 165, and optionally the control unit 90 to determine AC harmonics components such that harmonics induced in the current phases of the stator windings 110 can be reduced and/or compensated. In other words, the current provided to the rotor winding of the rotor 102 is modified with an AC component such that, based on the magnetic coupling with the stator windings 110 within the electric machine 100, effectively no harmonics are induced in the current phases of the stator windings 110 (or only harmonics with reduced amplitude). In order to be able to appropriately adjust the AC harmonics component provided by the first power converter 160 by phase and amplitude, the first power converter can optionally include a current controller.

The control circuit 95 can also take into account the control of the multi-phase current signal by the control unit 90 when determining the AC harmonics component. The control loop 95 can also be considered to be associated with the control unit.

The current controllers of the inverters 160, 165 can include appropriate power switches, particularly semiconductor transistors, to provide currents of appropriate amplitudes.

Figure 2:
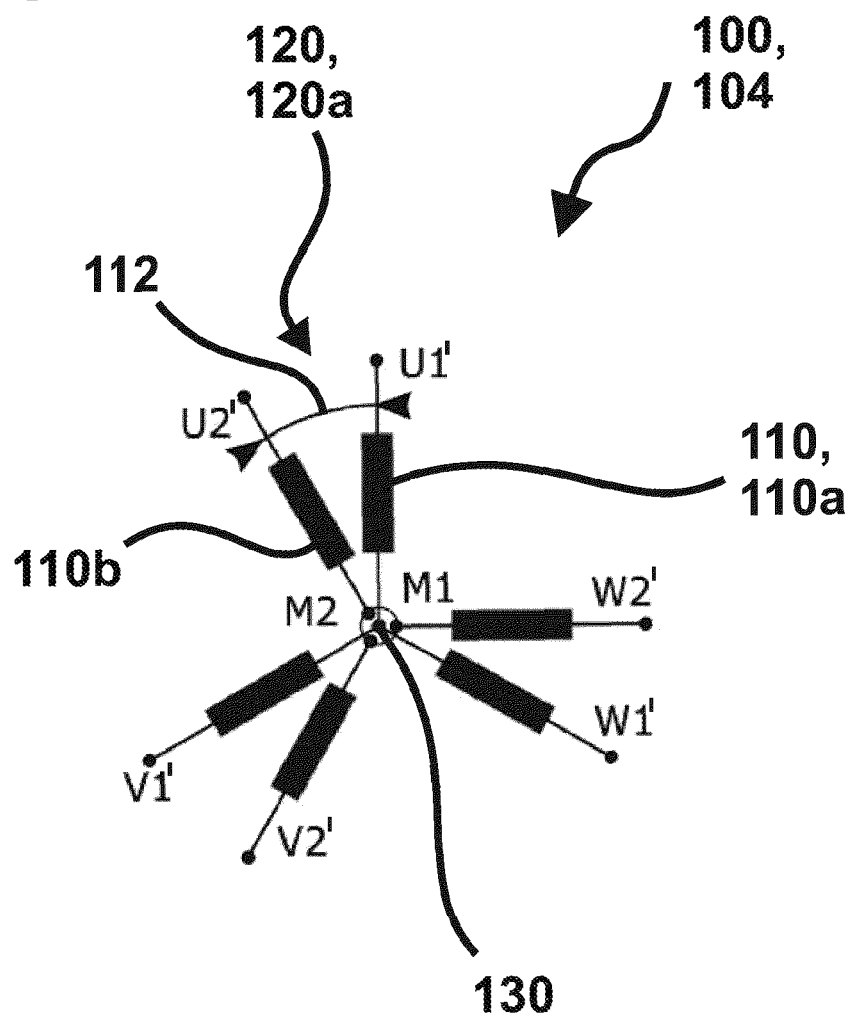
FIG. 2 shows a simplified schematic diagram of an equivalent circuit of the electric machine with the stator windings.

FIG. 2 shows a simplified schematic diagram of an equivalent circuit of the electric machine 100 with six stator windings 110.

In the present embodiment, the stator 104 comprises two stator winding sets, each comprising three stator windings 110. For each stator winding set, the respective three stator windings 110 are arranged according to an angular offset of 120° along the circumference of the stator 104. The two stator winding sets in turn have an angular offset 112, which in the present case is 30°. The stator windings of each stator winding set are generally arranged according to a star connection 130. This means that the three stator windings 110 of the first stator winding set are connected together in a first star point M1. The other ends of the stator windings 110 of the first stator winding set are coupled to an inverter 165a and corresponding current controller explained below and are supplied with the current phases U1', W1', V1', respectively. Similarly, the three stator windings 110 of the second stator winding set are connected together in a second star point M2 and the other ends are coupled to a further inverter 165b and corresponding current controller so that they are supplied with the current phases U2', W2', V2', respectively. The two inverters 165a, 165b together provide the multi-phase current signal for the stator windings corresponding to the second inverter 165 described earlier.

The arrangement of the stator windings 110 in corresponding but staggered stator winding sets results in three stator winding pairs 120, each having one stator winding of a stator winding set. By way of example, the stator winding pair 120a is formed by a first stator winding 110a of the first stator winding set and a first stator winding 110b of the second stator winding set. Due to the specific arrangement of the first and second stator windings 110a, 110b of the first stator winding pair 120a, a particularly strong magnetic coupling occurs between these stator windings within the electric machine 100. The magnetic coupling causes a leakage inductance. As a result, comparatively small voltage differences between the two stator windings 110, 110b of the stator winding pair 120a lead to comparatively high current fluctuations in the other stator winding of the stator winding pair 120a. In particular, the change in current can be greatly affected. This magnetic coupling among the stator windings 110 is taken into account by the control unit 90 when determining and providing the current phases using the second inverter 165.

The three-phase current of a stator winding set is to be understood in the present case as a vector current which, starting from the second inverter 165 with current controllers coupled on the output side, comprises the current components U1', V1', W1' and U2', V2', W2'. By means of the current controllers, these current components are modified in order to be able to perform phase and/or amplitude matching. In this respect, the individual current components can be regarded as different phases of the particular three-phase current.

In operation, the rotor 102 rotates about the axis of rotation at a certain rotational frequency. In addition to the previously described magnetic coupling among the stator windings 110, magnetic coupling also occurs between the stator windings 110 and the at least one rotor winding. As a result, harmonics can be induced in the current phases of the stator windings 110 by the rotor winding. The frequency of these harmonics is an integer multiple of the rotational frequency of the rotor/rotary field. Due to the geometry of the stator 104, i.e., the specific design of two three-phase stator winding sets with a 30° angular offset, harmonics of the $5^{th}$ and/or $7^{th}$ order in particular can be induced. These harmonics can cause current spikes, resulting in increased power dissipation and adversely affecting the maximum achievable torque. In addition, this causes increased stress on the components involved, so that their service life is reduced. Therefore, as previously described with reference to FIG. 1, these harmonics are reduced and/or compensated by the corresponding AC harmonics component supplied to the rotor winding.

Figure 3:
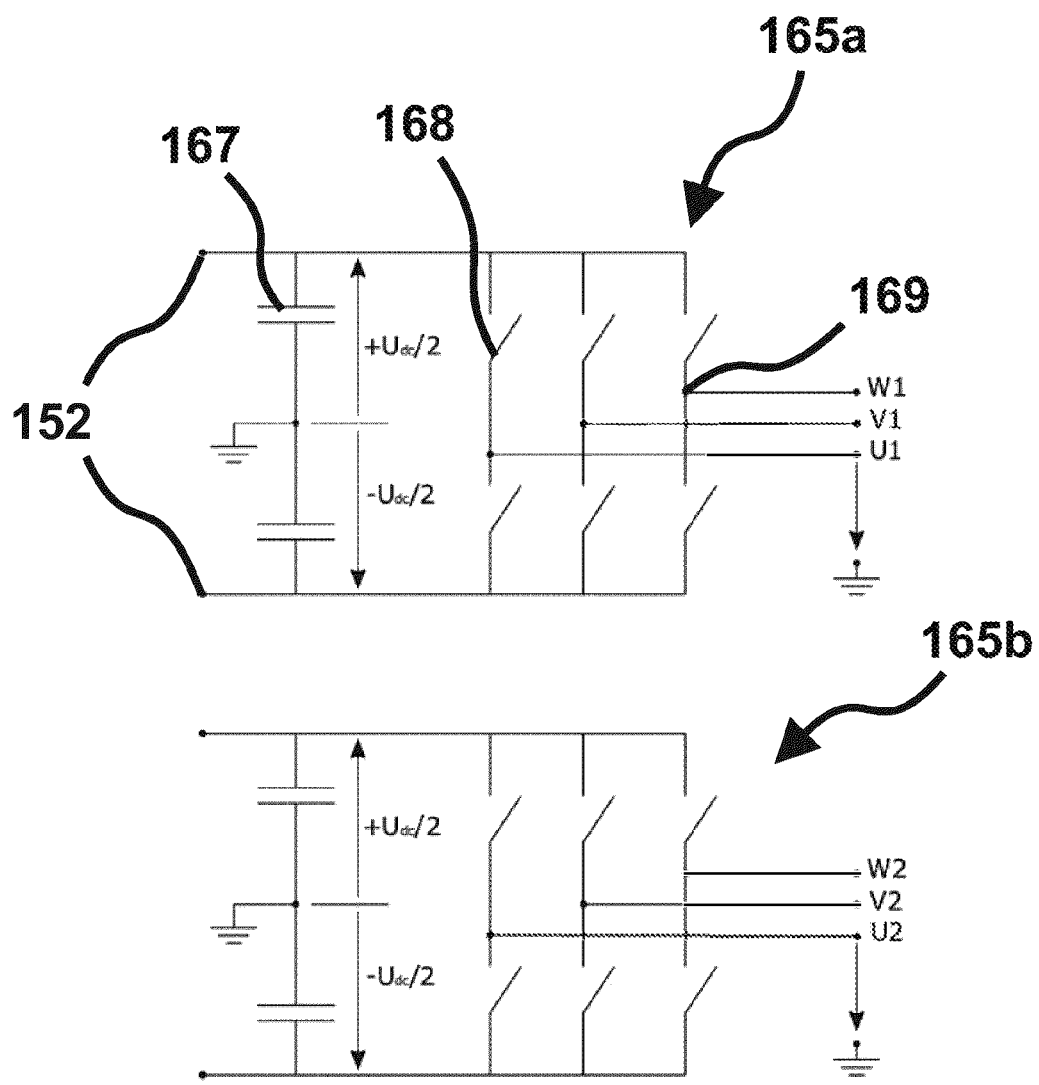
FIG. 3 shows a simplified schematic diagram of two inverters.

FIG. 3 shows a simplified schematic representation of two inverters 165a, 165b of the drive system 50. The two inverters 165a, 165b are identical in their general structure and mode of operation and serve to provide the current phases of the multi-phase current signal. Alternatively, the drive system 50 can also have only a single inverter 165, provided that it outputs the required number of current phases.

The first inverter 165a is coupled on the input side to a DC voltage source 152, by means of which a DC voltage is provided for the inverter 165a. The inverter 165a then comprises capacitors 167 and switching elements 168, in particular semiconductor switching elements, as well as intermediate taps 169 in known form in order to provide AC voltages on the output side. In the present case, the first inverter 165a is set up to provide the AC voltages which generally correspond to the current phases U1, V1, W1. These are output to respective current controllers on the output side, are adjusted by these according to phase and amplitude, and are then used for supplying to the stator windings 110 of the first stator winding set. The current controller thus provides corresponding current phases U1', V1', W1' based on the AC voltages provided by the first inverter 165a. Based on a comparison of actual currents present in the electric machine 100 and desired currents corresponding to a desired torque, the current controller serves to allow a readjustment of the actual currents to compensate for the particular difference. In this respect, the current controller has an influence in particular on the phases and amplitudes of the current phases U1', V1', W1'.

In a corresponding manner, the second inverter 165b is set up to provide AC voltages which are processed by a corresponding current controller to provide the current phases U2', V2', W2'. Also in this case, a corresponding control is taken into account to compensate for differences between the actual currents in the electric machine 100 and target currents corresponding to a desired torque.

The invention claimed is:

1. A drive system comprising:
   an electric machine set up as a synchronous machine, the electric machine including: a rotor rotatable about an axis of rotation, the rotor having at least one externally excited rotor winding, and at least one stator having at least two stator winding sets, each stator winding set having at least three stator windings;
   a control unit configured to control the electric machine such that: the at least one rotor winding is supplied with a first current signal during operation, and the stator windings are supplied at least partly with different current phases of a multi-phase second current signal during operation, wherein, as a result, a rotary magnetic field for generating a torque acting on the rotor is produced;
   at least one inverter, wherein the multi-phase current signal is provided based on the at least one inverter; and
   at least one rectifier providing a DC signal, wherein the first current signal is based at least on the DC signal and on an AC harmonics component, and
   wherein harmonics of at least one current phase of the multi-phase current signal, which are caused by a magnetic coupling occurring between the at least one rotor winding and the stator windings during operation, are reduced based on the supply of the at least one AC harmonics component to the at least one rotor winding.

2. The drive system of claim 1,
   wherein the at least one inverter and the at least one rectifier are coupled to at least one control loop by means of real-time communication means, and
   wherein the at least one control loop is set up to determine a phase and/or an amplitude of the at least one AC harmonics component in such a way that the harmonics of at least one current phase of the multi-phase current signal caused by the magnetic coupling are reduced according to an amplitude, in particular are compensated according to an amplitude.

3. The drive system of claim 1, wherein the at least one AC harmonics component has a first frequency, wherein a second frequency of a fundamental wave is based on a rotational frequency of the rotor and/or the rotary field, and wherein the first frequency is an integer multiple of the second frequency.

4. The drive system of claim 1, wherein the control unit supplies different current phases of a three-phase current to the stator windings during operation, and wherein the number of current phases is at least six.

5. The drive system of claim 1, wherein the stator windings of a stator winding set have an offset of 120° with respect to each other with respect to an axis of rotation of the rotor, wherein the at least two stator winding sets are arranged offset from each other by 30°, and wherein the two stator winding sets are formed electrically offset from each other by 30°.

6. The drive system of claim 1, wherein the stator winding sets are each connected in a star circuit with a potential-free star point, wherein the star points of the different stator winding sets are electrically isolated from each other.

7. An electrically drivable vehicle comprising the drive system of claim 1.

8. The drive system of claim 2, wherein the inverter, the rectifier and the control loop are set up in such a way that the at least one rotor winding is supplied with a plurality of AC harmonics components with respective amplitudes and/or phases in such a way that the harmonics caused by the magnetic coupling for each current phase of the multi-phase current signal are reduced in amplitude, in particular are compensated in amplitude.

9. The drive system of claim 3, wherein the first frequency of the AC harmonics component corresponds to at least the $4^{th}$ and/or $6^{th}$ harmonic.

* * * * *